April 14, 1959 R. A. GRUENBERG 2,881,478
READILY REPLACEABLE MOLD TOOLING
Filed May 31, 1956 2 Sheets-Sheet 1

INVENTOR.
R. A. GRUENBERG
ATTORNEY.

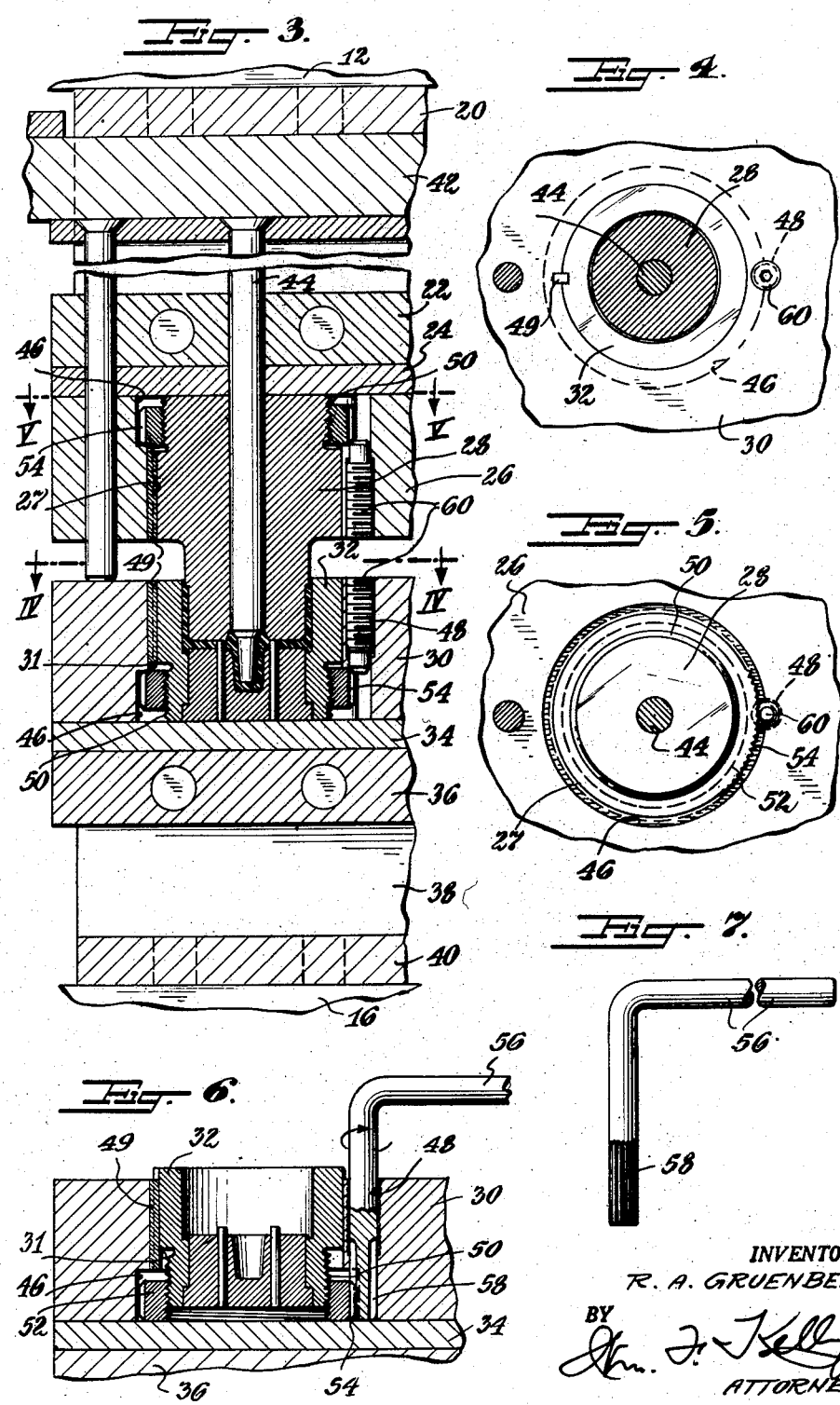

United States Patent Office 2,881,478
Patented Apr. 14, 1959

2,881,478

READILY REPLACEABLE MOLD TOOLING

Rudolph A. Gruenberg, Warren Point, N.J., assignor to Westinghouse Electric Corporation, East Pittsburgh, Pa., a corporation of Pennsylvania Application May 31, 1956, Serial No. 588,425

10 Claims. (Cl. 18—42)

The present invention relates to a molding press and, more particularly, to an improved molding die member assembly for such a machine.

Heretofore, molding presses employed in the art of manufacturing plastic bases for fluorescent lamps, discharge devices and radio tubes, have been provided with a plurality of suitably heated stationary female dies for receiving the charge of plastic tablets and a like number of similarly heated male dies which are reciprocated into engagement with the female dies to form the tablets into bases. As the male dies reciprocate out of engagement with the female dies, the bases are carried thereby and stripped therefrom by knockout pins. The individual male and female dies heretofore have been more or less permanently secured in their respective retainer plate which in turn is integrally affixed to a back-up plate, heater plate and clamping plate, thus forming the upper die member and lower die member assemblies, each weighing about one thousand pounds.

In order to replace a defective male or female die the heater plates must be turned off and the upper and lower die member assemblies allowed to cool from the approximate 350° F. operating temperature to room temperature. Due to the large mass involved, the cooling operation often takes from six to eight hours. The defective die member assembly must be unbolted from the molding press, transported to an adjacent bench and dismantled to replace the defective die. After reassembling, the repaired die member assembly is secured in the molding press and the die member assemblies are heated to the operating temperature. The entire operation usually requires two or three days to accomplish.

Although the male and female dies are chrome plated to provide a hardened molding surface, a piece of hardened plastic or foreign material, such as a screw or piece of dirt, in the die will cause a severe scratch or crack therein thus producing defective bases therefrom. It is the usual practice, due to the length of time required for replacement and the weight of the upper and lower mold assemblies, to close off such a defective die, thus decreasing the efficiency of the molding press by reducing the number of bases produced thereby during a given work cycle. Obviously, when sufficient individual dies have become defective and the efficiency of the molding press is reduced to a point where further operation of the molding press is not profitable, replacement of the defective dies is necessary.

It is the general object of the present invention to avoid and overcome the foregoing and other difficulties of and objections to the prior art molding presses by the provision of a readily detachable die member for more efficient operation of the molding press by the reduction to a minimum of lost production time due to repair and maintenance.

For a better understanding of the invention reference should be had to the accompanying drawings in which like numerals of reference indicate similar parts throughout the several views:

Fig. 3 is a vertical sectional view of a portion of the upper and lower die member assemblies in the closed or molding position along the line II—II of Fig. 1 and showing a fragmentary portion of the ram and bed plate of the molding press;

Fig. 4 is a horizontal sectional view of a male die and its associated retainer plate along the line IV—IV of Fig. 3 in the direction of the arrows;

Fig. 5 is a view similar to Fig. 4 of a female die and its associated retainer plate along the line V—V of Fig. 3 in the direction of the arrows;

Fig. 6 is a fragmentary vertical sectional view of the female die, retainer plate and backup plate and a tool employed to secure a seating member against one wall of an aperture in the retainer plate and the female die against the back-up plate;

Fig. 7 is a side elevational view of the tool employed for seating the replaceable die member in the retainer plate.

Although the apparatus of the invention is broadly applicable to molds of all types, the invention is particularly adapted for use in conjunction with the manufacture of plastic radio tube bases provided with a plurality of socket pins and a base locating key and hence it is so illustrated and will be so described.

Figure 1:
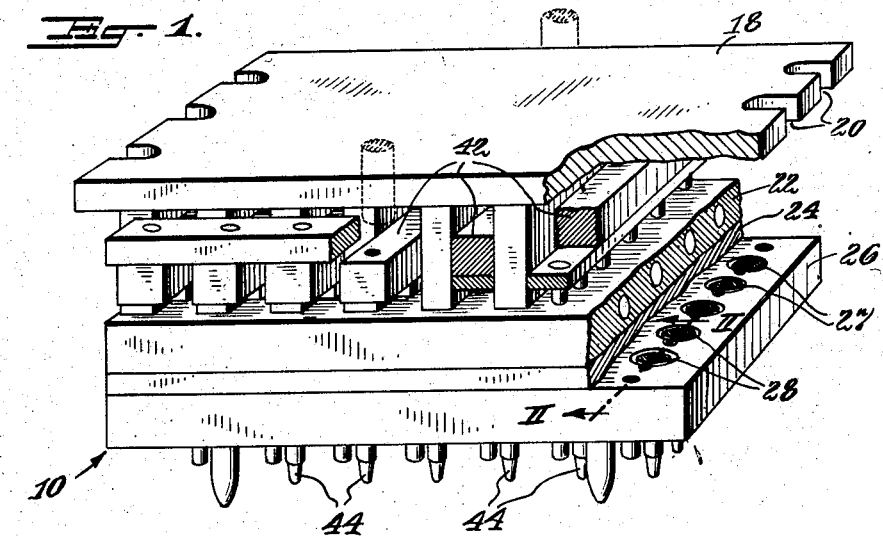
Fig. 1 is a perspective view of an upper die member assembly of the molding press for molding a plurality of, for example, radio tube bases and showing the assembly in its uppermost position.
Figure 2:
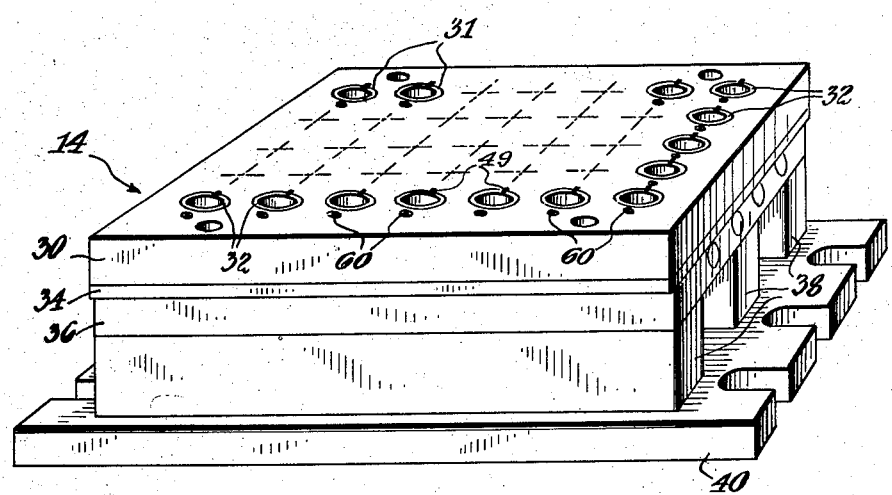
Fig. 2 is a perspective view of a lower die member assembly for the molding press.

With specific reference to the form illustrated in the drawings, the reference numeral 10, as shown in Fig. 1, indicates an upper die member assembly of a molding press for the manufacture and fabrication of plastic bases for radio tubes and carried by a reciprocating ram 12 (Fig. 3). A lower die member assembly 14 (Fig. 2) of the molding press is affixed to a bed plate 16 (Fig. 3) of the molding press.

Inasmuch as the molding press die member assembly, is old in the art and does not per se constitute the present invention, it is sufficient to say that the upper die member assembly 10 (Fig. 1) comprises essentially a clamping plate 18 secured to the ram 12, by bolts or the like (not shown), a plurality of spaced longitudinal spacers 20, a heater plate 22, back-up plate 24 and a retainer plate 26, provided with a plurality of recesses 27, for securing therein male dies 28 of the present invention. As is well known in the art the lower die member assembly 14 (Figs. 2, 3 and 6) is similar to the upper die member assembly 10 and comprises a retainer plate 30 provided with a plurality of recesses 31 for securing therein female dies 32 of the present invention, a back-up plate 34, heater plate 36, spacers 38 and clamping plate 40. After the male dies 28 engage the registering female dies 32 to mold heated tablets, which are inserted in the female dies 32, into bases, the bases are carried upwardly by the male dies 28 until knock-out bars 42 (Figs. 1 and 3) on the upper die member assembly 10 engage spring means (not shown) on the frame of the molding press and knock-out pins 44 carried thereby, strip the bases from the male dies 28 in the usual manner, as is well known in the art.

Since the die members, namely, the male dies 28 and the female dies 32 are provided with the same readily replaceable mounting means, the description of said means will be confined for reasons of simplicity to a discussion of the female dies 32. For the purpose of securing each die 32 in a given retaining recess 31 in the retainer plate 30 (Figs. 3 and 6), an aperture 46 is provided in the bottom surface of the plate 30 in axial alignment with the recess 31, which aperture 46 has a slightly larger diameter than the recess 31 to form a shoulder therebetween. A threaded hole 48 in the opposite surface of the plate 30 extends to the aperture 46. The die 32 is secured in the retainer recess 31 against rotation therein by means of a key 49 (Figs. 3, 4 and 6) and the die is provided with an externally threaded end 50 projecting into the aperture 46. To secure and properly seat the die 32 in the recess 31, an internally threaded seating member 52 is contained in the aperture 46 and engages the threaded end 50 of the die 32. To facilitate the rotation of the seating member 52 it is provided with gear teeth 54 on the outer face thereof. One satisfactory way of rotating the seating member 52 is to insert a tool 56 (Figs. 6 and 7) having gear-teeth 58 on one end into the hole 48 to engage the gear-teeth 54. By rotating the seating member 52 in a counterclockwise direction, as viewed in Fig. 6, the threaded end 50 of the die 32 is forced against the back-up plate 34 while the seating member 52 bears against the top wall or shoulder of the aperture 46 when such seating member is completely run up on the threaded end 50 of the die 32. In order to lock the seating member 52 in its die-locking position and to prevent foreign matter falling into the hole 48 a combined locking pin and plug 60 (Figs. 3 and 5) is inserted into the hole 48 to lock the seating member 52 in position against rotation during the molding operation.

It will be understood that each male die 28 is also secured in a recess 27 in the retainer plate 26 by a key 49 (Figs. 3 and 5), is provided with a threaded end 50 which projects into a similar aperture 46 in the retainer plate 26 and is engageable by a seating member 52 to force the threaded end 50 against the bottom of the back-up plate 24 to cause the seating member 52 to bear against the bottom wall of the recess 46 in the plate 26.

If in the operation of the molding press, one of the die member assemblies becomes defective, the defective die, for example, a female die 32 may be readily replaced by removing the locking pin 60 from the threaded hole 48 and inserting the tool 56 into the hole 48 so that the gear-teeth 58 thereon engage the gear-teeth 54 on the seating member 52. By turning the tool 56 in a clockwise direction, as viewed in Fig. 6, the defective die 32 will be moved upwardly on the key 49 and out of the retaining plate 30 until the threaded end 50 thereof becomes disengaged from the seating member 52 and the defective die 32 may then be removed by hand from the recess 31. Upon insertion of a replacement die 32 the tool 56 is turned in a counterclockwise direction, as viewed in Fig. 6, to once more force the threaded end 50 of the die 32 against the back-up plate 34 and the seating member 52 against one wall of the recess 46.

Although the seating member 52 has been described as having gear-teeth 54 on the outer face thereof, the seating member 52 may be provided with a knurled outer face (not shown) or serrations (not shown) for engagement with the gear-teeth 58 or such knurled outer surface or serrations on the operating end of the tool 56. Further, it is equally feasible, for example, to provide an annular segmental aperture (not shown) concentric with the retaining cavity in the retainer plate 30, in lieu of the locking pin hole 48, into which a screw driver like tool (not shown) may be inserted to move the gear-teeth 54 on the outer face of the seating member 52 in the desired direction. Likewise the hole 48 need not be threaded but may be tapered to receive a tapered locking pin (not shown) to lock the seating member 52 into its seated position.

It will be recognized that the objects of the invention have been achieved by the provision of readily replaceable female dies 32 and male dies 28. The improved die members reduce to a minimum loss of production time due to repairs and maintenance of the dies and permit the efficient operation of a molding press by making it feasible to provide almost continuous operation of the entire number of die members. Further, the improved die members eliminate the necessity of covering up defective dies until such time as it becomes imperative to dismantle the upper and lower mold assemblies to replace such defective dies.

While in accordance with the patent statutes one best embodiment of the invention has been illustrated and described in detail it is to be particularly understood that the invention is not limited thereto or thereby.

I claim:

1. The combination with a molding press having an upper die member assembly provided with a male die member recess and a lower die member assembly provided with a female die member recess, of a detachable die member insertable in each of said recesses and having an end projecting beyond the bottom of said recess, a retainer plate forming a part of each die member assembly and provided with an aperture in axial alignment with said recess and the die member therein, a seating member in said aperture engaging the end of said die member to secure said die member within said recess, and means engageable with said seating member to cause movement of said die member out of said recess when desired.

2. The combination with a molding press having an upper die member assembly provided with a male die member recess and a lower die member assembly provided with a female die member recess, of a detachable die member insertable in each of said recesses and having a threaded end projecting beyond the bottom of said recess, retainer means forming a part of each die member assembly and provided with an aperture of slightly larger diameter than said recess to form a shoulder therebetween and in axial alignment with said recess and the die member therein, a seating member in said aperture engaging the threaded end of said die member and bearing against said shoulder to force the end of said die member against said retainer means to secure said die member within said recess, and means insertable through an opening in the die member assembly and engageable with said seating member for turning and moving the latter into engagement with said retainer means to cause movement of said die member out of said recess when desired.

3. The combination with a molding press having an upper die member assembly provided with a plurality of male die member recesses and a lower die member assembly provided with a plurality of female die member recesses, of a detachable die member insertable in each of said recesses and having a threaded end projecting beyond the bottom of said recess, a back-up member, a retainer plate on said back-up member and forming a part of each die member assembly and provided with an aperture of slightly larger diameter than said recess to form a shoulder therebetween and in axial alignment with said recess and the die member therein, a seating member in said aperture engaging the threaded end of said die member and bearing against said shoulder to force the end of said die member against said back-up member to secure said die member within said recess, means insertable through an opening in the die member assembly and engageable with said seating member for turning and moving the latter into engagement with said back-up member to cause movement of said die member out of said recess when desired, and means in said retainer plate and said die member to prevent rotation of said die member when said seating member is rotated by said means engageable with said seating member.

4. The combination with a molding press having an upper die member assembly provided with a plurality of male die member recesses and a lower die member assembly provided with a plurality of female die member recesses, of a retainer plate provided with an aperture in one surface thereof and a hole in another surface thereof and extending to said aperture, a die member supported by said retainer plate in coaxial alignment with one of said recesses, said die member having one end projecting into said aperture, a back-up plate for said retainer plate and constituting a stop for said die member, a seating member in said aperture engaging the end of said die member and bearing against one wall of said aperture to seat said die member in said retaining plate and against said back-up plate, and means engageable with said seating member to disengage it from said die member and simultaneously cause movement of said die member out of said recess when desired.

5. The combination with a molding press having an upper die member assembly provided with a plurality of male die member recesses and a lower die member assembly provided with a plurality of female die member recesses, of a retainer plate provided with an aperture in one surface thereof and a hole in another surface thereof extending to said aperture, a die member supported by said retainer plate, said die member having one end threaded and projecting into said aperture, a back-up plate for said retainer plate and constituting a stop for said die member, a threaded seating member in said aperture engaging the threaded end of said die member and bearing against one wall of said aperture to seat said die member in said retaining plate and against said back-up plate, and means engageable with said seating member for rotating said seating member inot engagement with said back-up plate to cause movement of said die member out of said recess as desired.

6. The combination with a molding press having an upper die member assembly provided with a plurality of male die member recesses and a lower die member assembly provided with a plurality of female die member recesses, of a retainer plate provided with an aperture in one surface thereof and a hole in another surface thereof extending to said aperture, a die member supported by said retainer plate, said die member having one end threaded and projecting into said aperture, a back-up plate for said retainer plate and constituting a stop for said die member, a threaded seating member in said aperture engaging the threaded end of said die member and bearing against one wall of said aperture to seat said die member in said retainer plate and against said back-up plate, means on the outer face of said seating member to facilitate rotation of said seating member, and means engageable with said means on said seating member for rotating said seating member into engagement with said back-up plate to cause movement of said die member out of said recess as desired.

7. The combination with a molding press having an upper die member assembly provided with a plurality of male die member recesses and a lower die member assembly provided with a plurality of female die member recesses, of a retainer plate provided with an aperture in one surface thereof and a hole in another surface thereof extending to said aperture, a female die supported by said retainer plate, said female die having one end threaded and projecting into said aperture, a back-up plate for said retainer plate and constituting a stop for said female die, a threaded seating member in said aperture engaging the threaded end of said female die and bearing against one wall of said aperture to seat said female die in said retaining plate and against said back-up plate, means on the outer face of said seating member to facilitate rotation of said seating member, locking means in engagement with the wall of said hole and said seating member to lock the latter against rotation, and means insertable in said aperture upon removal of said locking means therefrom and engageable with said means on said seating member for rotating said seating member into engagement with said back-up plate to cause movement of said die member out of said recess as desired.

8. A die member assembly for a molding press comprising a retainer plate provided with a die member recess and an aperture in axial alignment with said recess, a detachable die member insertable in said recess and having an end projecting beyond the bottom of said recess, a seating member in said aperture engaging the end of said die member to secure said die member within said recess, and means engageable with said seating member to cause movement of said die member out of said recess when desired.

9. A die member assembly for a molding press comprising a back-up plate, a retainer plate on said back-up plate and provided with a die member recess and an aperture of slightly larger diameter than said recess to form a shoulder therebetween and in axial alignment with said recess, a detachable die member insertable in said recess and having a threaded end projecting beyond the bottom of said recess, a seating member in said aperture engaging the threaded end of said die member and bearing against said shoulder to force the end of said die member against said back-up plate to secure said die member within said recess, and means insertable through an opening in the die member assembly and engageable with said seating member for turning the latter to cause movement of said die member out of said recess when desired.

10. A die member assembly for a molding press comprising a back-up plate, a retainer plate on said back-up plate and provided with a die member recess and an aperture of slightly larger diameter than said recess to form a shoulder therebetween and in axial alignment with said recess, a detachable die member insertable in said recess and having a threaded end projecting beyond the bottom of said recess, a seating member in said aperture engaging the threaded end of said die member and bearing against said shoulder to force the end of said die member against said back-up plate to secure said die member within said recess, means insertable through an opening in the die member assembly and engageable with said seating member for turning the latter to cause movement of said die member out of said recess when desired and means in said retainer plate and said die member to prevent rotation of said die member when said seating member is rotated by said means engageable with said seating member.

References Cited in the file of this patent

UNITED STATES PATENTS

| | | |
|---|---|---|
| 1,736,149 | Dunmire | Nov. 19, 1929 |
| 2,018,480 | Apple | Oct. 22, 1935 |
| 2,479,350 | Haggart | Aug. 16, 1949 |
| 2,558,027 | Wilson | June 26, 1951 |

FOREIGN PATENTS

| | | |
|---|---|---|
| 707,988 | Great Britain | Apr. 28, 1954 |